US010620317B1

(12) United States Patent
Chai et al.

(10) Patent No.: US 10,620,317 B1
(45) Date of Patent: Apr. 14, 2020

(54) LIDAR-BASED HIGH DEFINITION MAP GENERATION

(71) Applicants: Chongqing Jinkang New Energy Automobile Co., Ltd., Chongqing (CN); SF Motors Inc., Santa Clara, CA (US)

(72) Inventors: Huajun Chai, Santa Clara, CA (US); Rui Yu, Santa Clara, CA (US); Fan Wang, Santa Clara, CA (US); Yifan Tang, Santa Clara, CA (US)

( * ) Notice: Subject to any disclaimer, the term of this patent is extended or adjusted under 35 U.S.C. 154(b) by 0 days.

(21) Appl. No.: 16/231,594

(22) Filed: Dec. 23, 2018

(51) Int. Cl.
*G01S 17/89* (2006.01)
*G01S 17/93* (2006.01)
*G05D 1/02* (2020.01)
*G06K 9/00* (2006.01)
*G06T 7/70* (2017.01)

(52) U.S. Cl.
CPC ............ *G01S 17/936* (2013.01); *G01S 17/89* (2013.01); *G05D 1/024* (2013.01); *G06K 9/00805* (2013.01); *G06T 7/70* (2017.01); *G06T 2207/10028* (2013.01); *G06T 2207/30261* (2013.01)

(58) Field of Classification Search
CPC ....... G01S 17/936; G01S 17/89; G05D 1/024; G06K 9/00806; G06K 9/00805; G06T 7/70; G06T 2207/30261; G06T 2207/10028

USPC ......................................................... 356/4.01
See application file for complete search history.

(56) References Cited

U.S. PATENT DOCUMENTS

| 8,861,842 | B2 * | 10/2014 | Jung .................. G06K 9/00805 382/155 |
| 9,734,455 | B2 * | 8/2017 | Levinson ............. G05D 1/0088 |
| 10,106,153 | B1 * | 10/2018 | Xiao .................. B62D 15/0285 |
| 10,222,211 | B2 * | 3/2019 | Chen .......................... G06T 7/11 |
| 2018/0299534 | A1 * | 10/2018 | LaChapelle ........... G01S 17/023 |

* cited by examiner

*Primary Examiner* — Daniel L Murphy

(74) *Attorney, Agent, or Firm* — Kilpatrick Townsend & Stockton, LLP

(57) ABSTRACT

Various arrangements for generating a high definition map are presented. An image of a roadway environment may be captured. A laser imaging detection and ranging point cloud of the roadway environment may be generated. An object recognition process may be performed on the image of the roadway environment to detect one or more objects present in the roadway environment. A fusion process may be performed using the lidar point cloud to identify a location of the one or more detected objects from the image in a vehicle frame of reference. The one or more objects may be mapped from the vehicle frame of reference to a global frame of reference An autonomous driving high definition map may be created that includes the mapped one or more objects in the global frame of reference.

17 Claims, 5 Drawing Sheets

LIDAR-BASED HIGH DEFINITION MAP GENERATION

BACKGROUND

For autonomous driving systems and driver-assistance systems to safely pilot vehicles, it may be beneficial for the systems to have access to a high accuracy map of the roadways which the vehicle is navigating. The high accuracy map may provide the autonomous driving system with an indication of what objects are present nearby, such as ahead on a roadway and hidden around a turn. Such a high accuracy map may include significantly more information than a typical navigational map. For instance, a high accuracy map may indicate the presence of traffic lights at an intersection, where roadway signs, lane markings, curbs, traffic islands, etc., are located. Generation of such a high accuracy map may typically be labor-intensive. For example, a human may manually review and tag objects present in images captured of a roadway environment. While such a manual arrangement may be acceptable for small geographic regions such as for testing purposes, such an arrangement may not be practical for large-scale generation of high accuracy maps, such as nationwide or worldwide.

SUMMARY

Various embodiments are described related to a method for generating an autonomous driving high definition map. In some embodiments, a method for generating an autonomous driving high definition map is described. The method may include capturing, using a camera system installed on a vehicle, an image of a roadway environment. The method may include creating, using a laser imaging detection and ranging (lidar) system installed on the vehicle, a lidar point cloud of the roadway environment. The lidar point cloud may be mapped to the image of the roadway environment. The method may include performing an object recognition process on the image of the roadway environment to detect one or more objects present in the roadway environment. The method may include performing a fusion process using the lidar point cloud to identify a location of the one or more detected objects from the image in a vehicle frame of reference. The method may include mapping the one or more objects from the vehicle frame of reference to a global frame of reference using global navigation satellite system (GNSS) data. The method may include creating the autonomous driving high definition map that comprises the mapped one or more objects in the global frame of reference.

Embodiments of such a method may include one or more of the following features: Performing the object recognition process may include performing a trained deep learning process on the image of the roadway environment to detect the one or more objects present in the roadway environment. Performing the object recognition process may include performing the trained deep learning process by an onboard processing system of the vehicle. Performing the object recognition process may include performing the trained deep learning process by a remote high definition map server system. The method may include calibrating the lidar system with the camera system such that distance measurements made using the lidar system correspond to determined image positions within images captured by the camera system. Performing the object recognition process on the image of the roadway environment to detect the one or more objects may include identifying a permanent object. The permanent object may be a permanent stationary object that may be expected to remain stationary over time. The method may include identifying an impermanent object. The impermanent object may be moveable and may be expected to move over time. The method may include, in response to identifying the impermanent object, removing the impermanent object from inclusion in the autonomous driving high definition map. The method may include performing the object recognition process on the image of the roadway environment to detect a two-dimensional item present in the roadway environment that may be included in the autonomous driving high definition map. The method may include mapping the two-dimensional item from the vehicle frame of reference to the global frame of reference using global navigation satellite system (GNSS) data. The method may further include capturing, using a GNSS system installed on the vehicle, the GNSS data. The method may further include driving, using an onboard autonomous driving system, a second vehicle using the created autonomous driving high definition map.

In some embodiments, a system for generating an autonomous driving high definition map is described. The system may include a global navigation satellite system (GNSS) sensor. The system may include a camera system that captures an image of a roadway environment. The system may include a laser imaging detection and ranging (lidar) system that creates a lidar point cloud of the roadway environment. The system may include a processing system, comprising one or more processors, that may be configured to perform object recognition on the image of the roadway environment to detect one or more objects present in the roadway environment. The system may be configured to perform a fusion process using the lidar point cloud to identify a location of the one or more detected objects from the image in a vehicle frame of reference. The processing system may be configured to map the one or more objects from the vehicle frame of reference to a global frame of reference using data from a GNSS sensor. The system may be configured to create the autonomous driving high definition map that comprises the mapped one or more objects in the global frame of reference.

Embodiments of such a system may include one or more of the following features: The processing system being configured to perform the object recognition process may include the processing system being configured to perform a trained deep learning process on the image of the roadway environment to detect the one or more objects present in the roadway environment. The GNSS sensor, the camera system, the lidar system, and the processing system may be installed on-board a vehicle. The GNSS sensor, the camera system, and the lidar system may be installed on-board a vehicle and the processing system may be part of the remote server system. The processing system may be further configured to calibrate the lidar system with the camera system such that distance measurements made using the lidar system correspond to determined image positions within images captured by the camera system. The processing system may be further configured to identify a permanent object. The permanent object may be a permanent stationary object that may be expected to remain stationary over time. The processing system may be further configured to identify an impermanent object. The impermanent object may be moveable and may be expected to move over time. The processing system may be further configured to remove the impermanent object from inclusion in the autonomous driving high definition map in response to identifying the impermanent object. The processing system may be further configured to perform the object recognition process on the image of the roadway environment to detect a two-dimensional item present in the roadway environment that may be included in the autonomous driving high definition map. The processing system may be further configured to map the two-dimensional item from the vehicle frame of reference to the global frame of reference using data from the GNSS sensor.

In some embodiments, an apparatus for generating a high definition map of a roadway is described. The apparatus may include a means for capturing an image of a roadway environment. The apparatus may include a means for creating a distance point cloud of the roadway environment. The apparatus may include a means for performing an object recognition process on the image of the roadway environment to detect one or more objects present in the roadway environment. The apparatus may include a means for performing a fusion process using the distance point cloud to identify a location of the one or more detected objects from the image in a vehicle frame of reference. The apparatus may include a means for mapping the one or more objects from the vehicle frame of reference to a global frame of reference. The apparatus may include a means for creating the autonomous driving high definition map that comprises the mapped one or more objects in the global frame of reference.

Embodiments of such an apparatus may include one or more of the following features: The apparatus may further include means for performing the object recognition process on the image of the roadway environment to detect a two-dimensional item present in the roadway environment that may be included in the autonomous driving high definition map. The apparatus may include means for mapping the two-dimensional item from the vehicle frame of reference to the global frame of reference.

DETAILED DESCRIPTION

Figure 1:
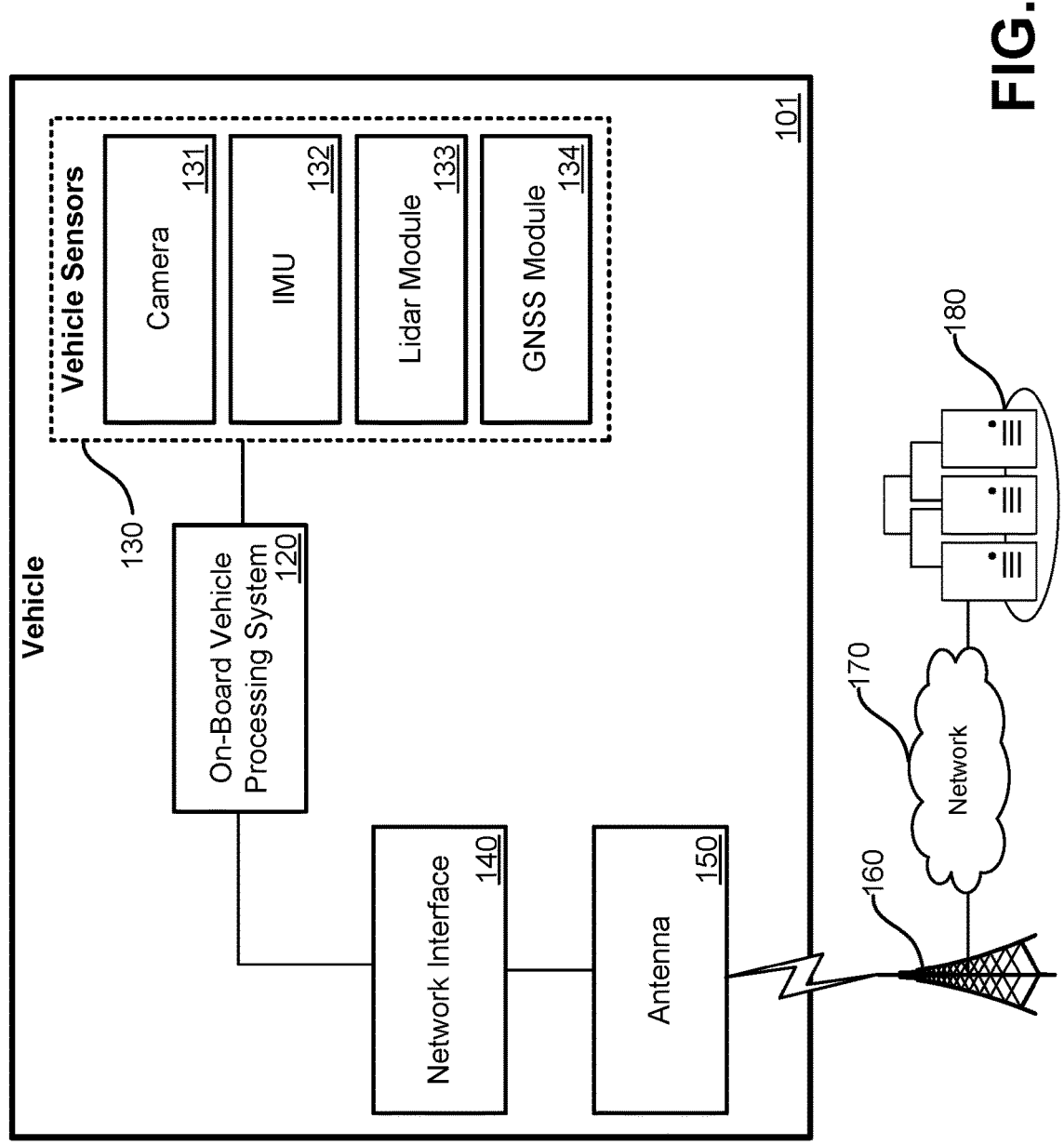
FIG. 1 illustrates a block diagram of an embodiment of a vehicle-based system for gathering and processing data about a roadway environment.

A high definition map may include information that an autonomous driving system or driver-assistance system can use to operate or drive a vehicle with an increased amount of safety and/or efficiency. For example, a high definition map may include: locations of lane boundaries; indications of street signs; fixed obstacles (e.g., curbs, traffic islands, guardrails, bridge supports); traffic lights; etc. To generate such a high definition map, a vehicle may be driven (either manually by a human driver or autonomously) on a roadway while an onboard vehicle system is used to capture information about the roadway environment. The captured information may then be processed locally onboard the vehicle and/or remotely at a remote server system to generate a high definition map. The high definition map may then be used for controlling a vehicle that is driving on the roadway.

To generate the high definition map, one or more cameras installed on the vehicle may be used to capture images of the roadway environment. Additionally installed on the vehicle may be a lidar (light detection and ranging) system that can measure the distance from the lidar system to objects present in the roadway environment. The one or more cameras and the lidar system may be calibrated such that a point to which a distance is measured by the lidar system can be mapped to a location with an image captured by the camera. An image recognition process may be performed on captured images to identify particular types of objects, such as pedestrians, vehicles, traffic lights, signs, obstacles, etc. Impermanent objects, such as vehicles and pedestrians, may be filtered out and not used for creating the high definition map. Using a combination of the lidar distance measurements and the recognized objects from the captured images, the location of particular types of objects may be determined in reference to the vehicle. Global navigation satellite system data may be used to convert the location of the objects from the vehicle's frame of reference to a global frame of reference.

The mapped identified objects may then be stored as part of a database of high definition map data and may be accessed or otherwise provided to an autonomous driving system on a vehicle. The high definition map may be used for autonomous driving of a vehicle. An "autonomous driving system" refers to a system that can drive, operate, or pilot a vehicle for a period of time without human input being needed to control the vehicle. The high definition map data may also be used by a "driver-assistance system." A driver-assistance system may perform at least some of the tasks that are typically performed by a human driver or serve as a safety failsafe for situations in which a human driver has performed a likely mistaken or incorrect action while driving (e.g., failing to brake for a red traffic light, drifting out of a lane, failing to stop or slow down by an appropriate distance from an obstacle in the path of the driver's vehicle).

Further detail regarding such embodiments is provided in relation to the figures. FIG. 1 illustrates a block diagram of an embodiment 100 of a vehicle-based system for gathering and processing data about a roadway environment. Embodiment 100 may include: vehicle 101; onboard vehicle processing system 120; vehicle sensors 130; network interface 140; antenna 150; cellular network 160; network 170; and map server system 180.

Vehicle 101 can refer to various forms of vehicles. Vehicle 101 may be a passenger car, pickup truck, sport utility vehicle, truck, motorized cart, all-terrain vehicle, motorcycle, powered scooter, or some other form of powered vehicle. Such vehicles may be configured to be controlled by a human driver (hereinafter a "driver"), an autonomous driving system (or driver-assistance system), or both. Therefore, at least in some vehicles, a driver may control the vehicle, while at other times the autonomous driving system may control the vehicle.

Vehicle sensors 130 can include: camera 131, IMU (inertial measurement unit) 132, lidar module 133; and GNSS (global navigation satellite system) module 134. As part of vehicle sensors 130, camera 131 may be present. In some embodiments, more than one camera may be present. Multiple cameras may have different or overlapping fields-of-views. In some embodiments, the angle of field-of-view is different, such as for short-range and long-range cameras. Camera 131 may be a visible light camera that has a field-of-view of the environmental scene in front of vehicle 101. Lidar module 133 may be used to determine the distance to objects in the roadway environment of vehicle 101. Camera 131, lidar module 133, and onboard vehicle processing system 120 may be calibrated such that a lidar measurement can be mapped to a particular location within an image captured by camera 131. Lidar module 133 may capture a point cloud that represents distances from lidar module 133 to the nearest object in a variety of directions. Therefore, for a given captured image, multiple points (e.g., tens, hundreds) from a captured point cloud may be mapped to different locations with the image. These points are representative of the measured distance from the vehicle or lidar module to objects present within the image.

GNSS module 134 may use one or more GNSS satellite systems to determine a precise location of GNSS module 134 and, thus, by extension, vehicle 101 on which GNSS module 134 is installed. GNSS module 134 may use GPS, GLONASS, Galileo, BeiDou (BDS) or some other form of navigation satellite system to determine a location of vehicle 101. IMU 132 may be used to determine the speed and direction of vehicle 101. This data may be used alternatively or in addition to speed and direction data obtained from GNSS module 134.

Onboard vehicle processing system 120 may receive data from vehicle sensors 130. Onboard vehicle processing system 120 may further communicate with map server system 180 through network interface 140 and antenna 150. Onboard vehicle processing system 120 may include various computerized components, such as one or more processors and communication busses. The one or more processors used as part of onboard vehicle processing system 120 may include one or more specific-purpose processors that have various functionality hardcoded as part of the one or more processors, such as an application-specific integrated circuit (ASIC). Additionally or alternatively, one or more general-purpose processors may be used as part of onboard vehicle processing system 120 that execute stored instructions that cause the general-purpose processors to perform specific-purpose functions. Therefore, software and/or firmware may be used to perform at least some of the functions of onboard vehicle processing system 120. Further detail regarding the functioning of onboard vehicle processing system 120 is provided in relation to FIG. 2.

In some embodiments, onboard vehicle processing system 120 performs processing on captured images from camera 131 and processing on point-cloud data received from lidar module 133. Onboard vehicle processing system 120 may be used to perform an object recognition process on captured images to identify one or more types of objects. Onboard vehicle processing system 120 may map distances measured using the lidar module 133 to locations in captured images. The absolute location of objects may be determined by analyzing location data obtained from GNSS module 134 to objects identified in the images and distances measured using lidar module 133. In other embodiments, some or all of this processing may be performed remotely at map server system 180.

Network interface 140 may be used to facilitate communication between onboard vehicle processing system 120 and various external sources. In some embodiments, network interface 140 uses antenna 150 to wirelessly communicate with cellular network 160, which may be a 3G, 4G, 5G, or some other form of wireless cellular network. Cellular network 160 may use one or more networks 170, which can include the Internet, to communicate with a remote map server system 180. Map server system 180 may be operated by an entity that creates and stores high definition map data for use by autonomous vehicles. For instance, map server system 180 may be operated by (or have operated on its behalf) a manufacturer or provider of autonomous vehicles or autonomous driving services. Therefore, map server system 180 may communicate with a large number (e.g., thousands) of autonomous driving systems 110 deployed in geographically-scattered vehicles. Network interface 140 may also be able to communicate with other forms of wireless networks. For instance, network interface 140 may be used to communicate with a wireless local area network (WLAN), such as a Wi-Fi network to which on-board vehicle processing system 120 has permission to access. For example, when parked at a home or office, vehicle 101 may be within range of a Wi-Fi network, through which the Internet and map server system 180 may be accessed. Other forms of network-based communication with map server system 180 are possible, such as a Bluetooth communication link via a vehicle occupant's mobile device to a cellular network or WLAN. In other embodiments, rather than wirelessly transmitting data to map server system 180, data captured using vehicle sensors 130 may be stored locally onboard vehicle 101, such as to a solid state drive or other form of non-transitory processor-readable medium. The captured data may then be transferred to the map server system, such as via a wired communication arrangement or by a removable form of non-transitory processor-readable medium being used (e.g., flash memory, solid state drive).

Figure 2:
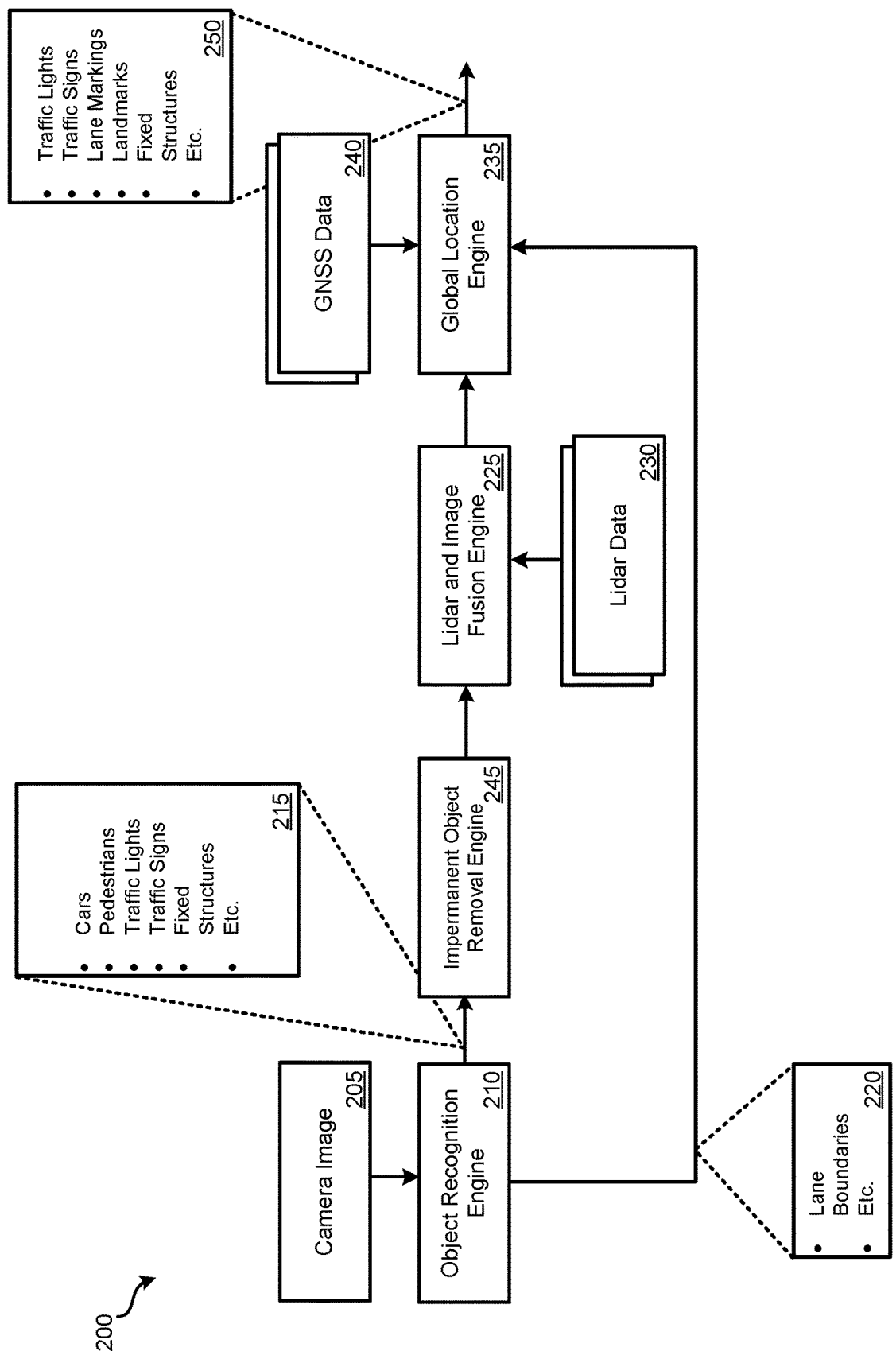
FIG. 2 illustrates a block diagram of an embodiment of a system for building a high definition map using data gathered by the vehicle-based system.

FIG. 2 illustrates a block diagram of an embodiment of a system 200 for building a high definition map using data gathered by the vehicle-based system. System 200 represents various components that may be implemented using specialized hardware or software executed by one or more general-purpose processors, for example, one or more specific-purpose processors that have various functionalities hardcoded as part of the one or more processors, such as an ASIC. Further, the various components of system 200 may be part of onboard vehicle processing system 120 or map server system 180. In some embodiments, the functionality of some components may be part of onboard vehicle processing system 120 while others are performed remotely as part of map server system 180.

Camera image 205 may be received for processing. A camera image may be received periodically, such as every 500 ms. Each camera image may be initially processed using object recognition engine 210. Object recognition engine 210 may be trained to recognize various types of objects. Such types of objects, such as indicated by exemplary object type list 215, can include: vehicles; pedestrians; traffic lights; fixed structures; lane marking; curbs; fixed obstacles; traffic islands; traffic signs; etc. Object recognition engine 210 may use a neural network or other form of deep-learning-based object recognition module. If object recognition engine 210 is based on deep learning, object recognition engine 210 may have initially been provided with a large set of images that have the object types that are desired to be identified properly tagged. This set of images may be used to train object recognition engine 210 to properly recognize instances of the same types of objects. Once properly trained and tested, object recognition engine 210 may operate on received images without human intervention or monitoring. That is, object recognition engine 210 may be able to recognize the trained object types without a human manually tagging the trained object types. In some embodiments, a human may perform some level of review to confirm that each object or some objects were correctly located and tagged.

Of the trained object types, both impermanent and permanent objects are present. Impermanent objects are objects that are either currently moving or are expected to move over time. For example, vehicles and pedestrians are types of impermanent objects. At any given time, a vehicle or pedestrian may not be moving; however, it can be expected that the pedestrian and vehicle will at some point move and are not obstacles that should be included in a high definition map. Permanent objects are objects that are not expected to move over time. For example, traffic lights, traffic signs, bridge supports, curbs, and walls are types of permanent objects. Such objects can be expected to be fixed in position unless roadway construction changes the configuration of permanent objects.

Impermanent object removal engine 245 may serve to tag or otherwise select impermanent objects that are to be removed from inclusion in the final generated high definition map data. Impermanent object removal engine 245 may be configured to remove all types of impermanent objects. These impermanent objects include vehicles and pedestrians. Impermanent object removal engine 245 may be reconfigured to include additional or fewer types of impermanent objects.

Lidar and image fusion engine 225 may serve to fuse lidar data 230 obtained from lidar module 133 and objects present in captured images that have not been removed by impermanent object removal engine 245. Lidar data 230 may be in the form of a point cloud that includes distance measurements in a direction in which the distance measurement was made. Lidar data 230 may be captured at the same time or a similar time as the image with which the lidar data is being fused by lidar and image fusion engine 225. That is, while camera 131 is capturing an image, lidar module 133 may be capturing a point cloud representative of distances to various locations present within the image. Therefore, in order for the point cloud to be accurately representative of the distances to various locations within the image, the point cloud may be captured within a threshold time of when the image was captured, such as 100 ms. Lidar and image fusion engine 225 may be calibrated such that particular points from within the captured point cloud are mapped to locations within the captured image. By using these mapped locations, the distance to the objects identified by object recognition engine 210 within the captured images can be determined. The output of lidar and image fusion engine 225 may be indications of tagged objects along with relative distances and directions from the vehicle (or the lidar module) to the tagged objects.

The output of lidar and image fusion engine 225 may be passed to global location engine 235. Global location engine 235 may receive GNSS data 240 from GNSS module 134. Global location engine 235 may convert the distance and direction data of identified objects from the vehicle frame of reference to a global frame of reference. The received GNSS data 240 may indicate a precise location in the form of global coordinates. These global coordinates may be obtained at the same or approximately the same time as lidar data 230 and camera image 205 were obtained. In some embodiments, the global coordinates may be obtained within a threshold period of time, such as 100 ms, of when camera image 205 and lidar data 230 were obtained. Using the global coordinates and the distance and direction to the object from the vehicle, global location engine 235 may determine the global location of the identified objects. The location and type of these objects may be output as high definition map data. The location and type of these objects may be added to a high definition map database that may be later accessed to help control a vehicle performing autonomous driving.

In some situations, one or more types of objects, such as indicated in list 220, may not be fused with lidar data. For instance, some types of objects may not be classified as an obstacle (referred to as "non-obstacle objects"). For example, lane boundaries on a roadway may be a non-obstacle object that is essentially flat on the roadway and may not function as an obstacle because a vehicle can drive over them. Object recognition engine 210 may identify lane boundaries and/or other non-obstacle objects, and may pass information about the lane boundaries directly to global location engine 235. Based upon the location of the lane boundaries and/or other non-obstacle objects within camera image 205 as detected by object recognition engine 210, global location engine 235 may determine the location of the lane boundaries and/or other non-obstacle objects within a global frame of reference. The location and type of these non-obstacle objects may be output as high definition map data and stored to the high definition map database for later use in controlling a vehicle performing an autonomous driving. The output of system 200 can include object types such as in exemplary list 250.

Figure 3:
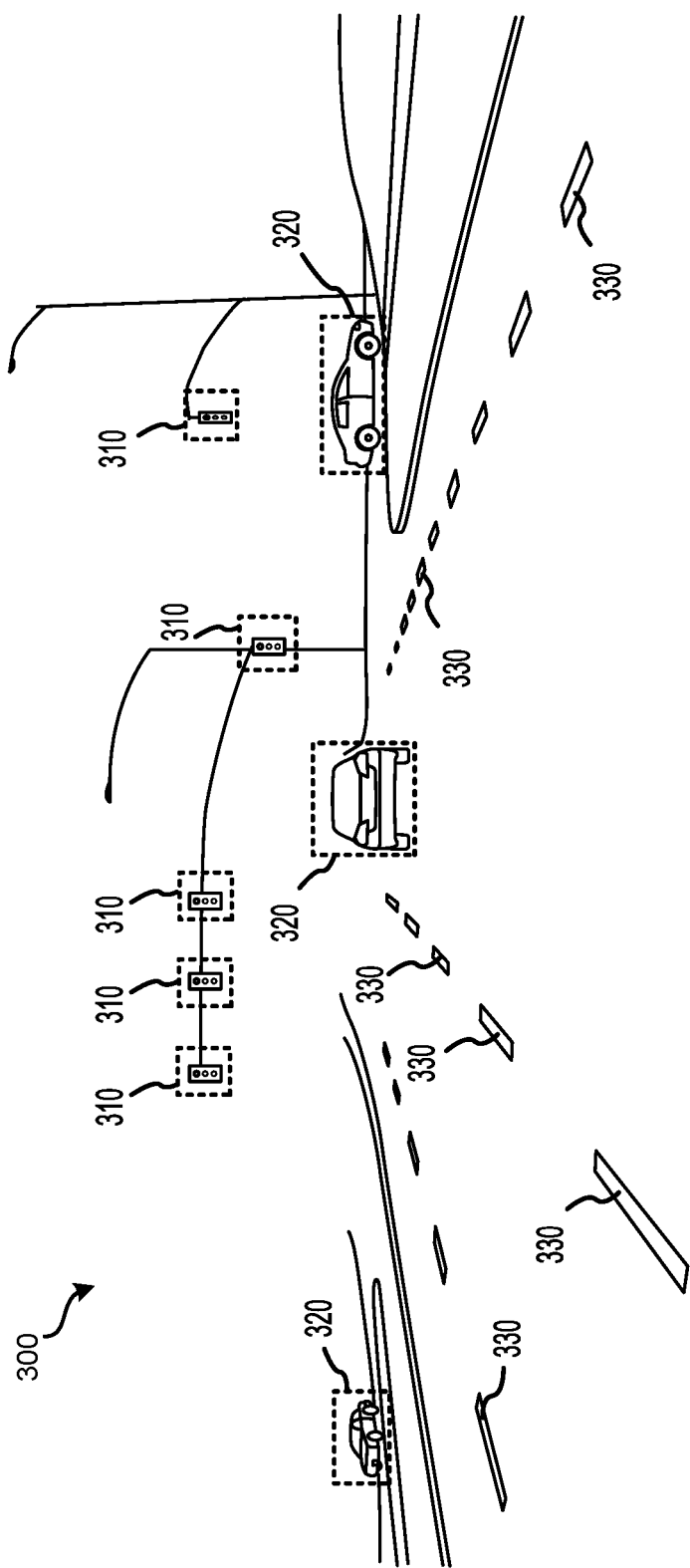
FIG. 3 illustrates an image that may be captured and object recognition processing that may be performed on the image.

FIG. 3 illustrates an image 300 that may be captured and object recognition processing that may be performed on the image. Image 300 may represent an image that has been processed by object recognition engine 210. Object recognition engine 210 may identify: traffic lights 310; vehicles 320; and lane markings 330. Data from a lidar point cloud and GNSS data may be used to determine the absolute location of some of the identified objects in image 300. For instance, the absolute location of traffic lights 310 may be determined. The location of vehicles 320 may be discarded since vehicles 320 are impermanent objects. The location of lane markings 330 may be determined using image 300 and GNSS data (without lidar data).

Figure 4:
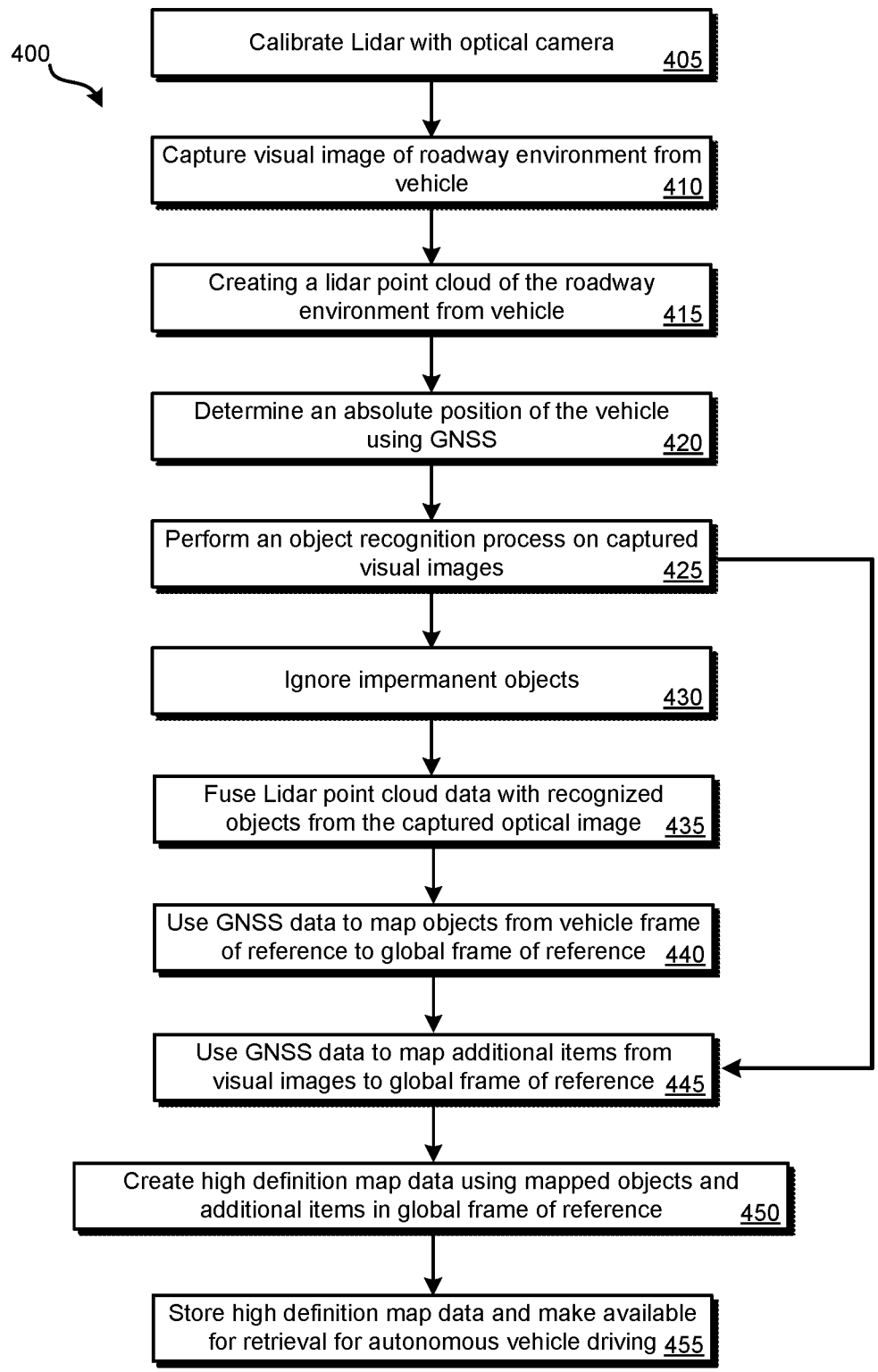
FIG. 4 illustrates an embodiment of a method for generating high definition map data for operating an autonomous vehicle.

Various methods may be performed using the systems and devices of FIGS. 1 and 2. FIG. 4 illustrates an embodiment of a method 400 for generating high definition map data for operating an autonomous vehicle. Each block of method 400 may be performed using system 200. Components of system 200 may be incorporated as part of onboard vehicle processing system 120 or map server system 180. Therefore, performance of method 400 may be performed at onboard vehicle processing system 120, map server system 180, or a combination of onboard vehicle processing system 120 and map server system 180.

Further, it should be understood that no portion of method 400 is manually performed by a person. Rather, all of method 400 is performed without a need for a human to provide input for the high definition map data to be created. In some embodiments, a human may drive a vehicle to which the lidar module, GNSS module, and camera are installed to gather the data to create the high definition map. In other embodiments, the vehicle may be autonomously driven, possibly without a human onboard.

At block 405, the optical camera may be calibrated with the lidar module. This calibration process may be used to map particular points (measurements in particular directions) of the lidar point cloud with locations in images captured by the optical camera. Once calibrated, distance measurements from the lidar point cloud may be used to determine the distance to particular objects within images captured by the optical camera.

At block 410, one or more images of the roadway environment may be captured from a vehicle that is traveling on the roadway. The image may be time stamped. Simultaneously or within a threshold period of time earlier or later than the capturing of the one or more images, a lidar point cloud of the roadway environment may be created based on lidar measurements made from the vehicle at block 415. Each point within the point cloud may have a particular direction and distance. The lidar point cloud may also be associated with the timestamp. At the same time or within a threshold period of time earlier or later than the capturing of the one or more images, at block 420, a GNSS module may be used to determine an absolute position of a GNSS module present on the vehicle, and therefore can be used as indicative of the vehicle's absolute location. The GNSS data may also be associated with the timestamp. The timestamps of the lidar point cloud, the captured image, and the GNSS data may be compared to determine whether all of such data was captured within a threshold period of time.

At block 425, an object recognition process may be performed on the captured image. The object recognition process may be performed to identify particular types of objects for which the object recognition process has been trained. A deep learning process may be used to train the object recognition process. For example, a neural network may be created that can identify various types of objects that are of interest for high definition map creation. At block 430, object types that have been classified as impermanent objects, such as vehicles and pedestrians, may be removed from consideration for inclusion in the output high definition map data. Such impermanent objects and their associated locations may be ignored for the remainder of method 400.

At block 435, lidar point cloud data may be fused with the recognized objects in the captured images. Since the lidar module was previously calibrated with the optical camera, distance measurements from the lidar point cloud may be used to determine the distance from the vehicle to objects identified at block 425 within the image captured at block 410. At block 435, the distance and direction from the vehicle to identified permanent objects may be determined. At block 440, GNSS data may be used to map objects from the vehicle frame of reference to a global frame of reference. Therefore, following block 440, the absolute locations of objects identified using the object recognition process of block 425 may be determined.

At block 445, GNSS data may be used to map other object types that were not fused with lidar point cloud data at block 435. For example, lane markings may be a type of object identified at block 425 for which an absolute location is identified using GNSS data in addition to the location of the lane markings within the captured image. Sense lane markings are essentially two-dimensional, lidar data may not be used and the lane marking can be expected to be present on the roadway surface.

At block 450, the high definition map data may include the mapped objects in the global frame of reference. At block 455, this high definition map data may be stored for later retrieval for use for autonomous driving activities. For example, when a vehicle approaches a region, high definition map data for the region may be provided to the vehicle for use by an onboard autonomous driving system. Such high definition map data may allow the onboard autonomous driving system to anticipate where traffic lights, traffic signs, and obstacles are expected to be present.

Figure 5:
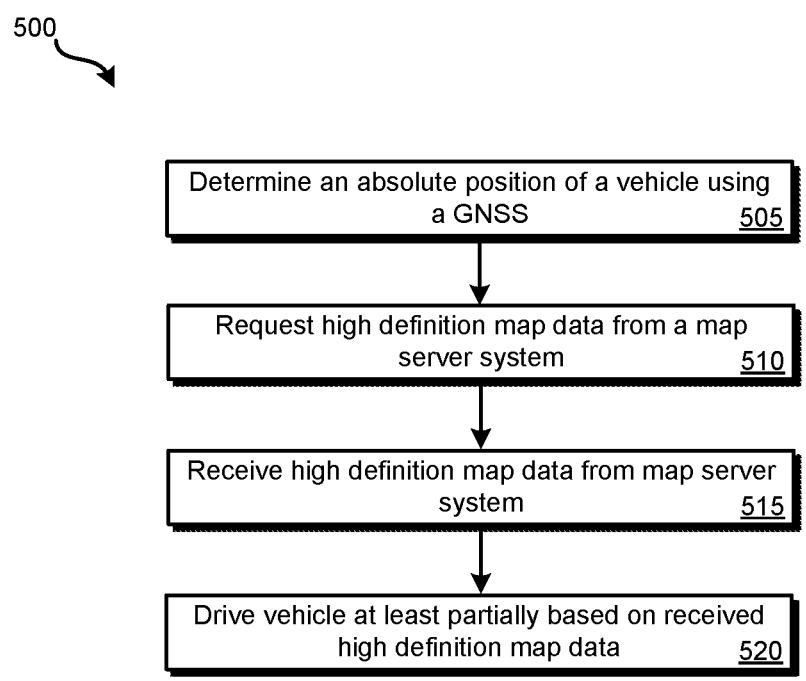
FIG. 5 illustrates an embodiment of a method for using high definition map data for operating an autonomous vehicle.

FIG. 5 illustrates an embodiment of a method 500 for using high definition map data for operating an autonomous vehicle. Method 500 may be performed using high definition map data created using method 400. Method 500 may be performed using the systems and devices of FIG. 1. At block 505, an absolute position of a vehicle may be determined using GNSS measurements made using a GNSS module installed on a vehicle. The vehicle may be performing autonomous driving or some form of driver assistance. At block 510, a request to the map server system may be made that requests high definition map data for a region relative to the absolute position of the vehicle determined at block 505. The high definition map data requested at block 510 may have been created as part of method 400. In some embodiments, rather than the high definition map data being requested at block 510 from a map server system, the high definition map data may be stored locally on a non-transitory processor readable medium by an onboard vehicle processing system present on a vehicle.

High definition map data may be received at block 515 from the map server system in response to the request of block 510. At block 520, the vehicle may be driven autonomously at least partially based on the received high definition map data. This high definition map data may help an onboard autonomous driving system detect the location of permanent objects that affect how and where the vehicle is driven. For example, the location of a traffic light can be anticipated based on high definition map data indicating that a traffic light is present at an upcoming intersection.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for generating an autonomous driving high definition map, the method comprising:
   capturing, using a camera system installed on a vehicle, an image of a roadway environment;
   creating, using a laser imaging detection and ranging (lidar) system installed on the vehicle, a lidar point cloud of the roadway environment, wherein the lidar point cloud is mapped to the image of the roadway environment;
   performing an object recognition process on the image of the roadway environment to detect one or more objects present in the roadway environment, wherein performing the object recognition process comprises performing a trained deep learning process on the image of the roadway environment to detect a plurality of objects present in the roadway environment;
   identifying one or more detected objects of the plurality of detected objects from the trained deep learning process that are classified as impermanent;
   performing a fusion process using the lidar point cloud to identify a location of the one or more detected objects from the image in a vehicle frame of reference, wherein the identified one or more detected objects classified as impermanent are ignored from the fusion process;
   mapping the one or more objects from the vehicle frame of reference to a global frame of reference using global navigation satellite system (GNSS) data; and
   creating the autonomous driving high definition map that comprises the mapped one or more objects in the global frame of reference.

2. The method for generating the autonomous driving high definition map of claim 1, wherein performing the object recognition process comprises performing the trained deep learning process by an onboard processing system of the vehicle.

3. The method for generating the autonomous driving high definition map of claim 1, wherein performing the object recognition process comprises performing the trained deep learning process by a remote high definition map server system.

4. The method for generating the autonomous driving high definition map of claim 1, further comprising:
   calibrating the lidar system with the camera system such that distance measurements made using the lidar system correspond to determined image positions within images captured by the camera system.

5. The method for generating the autonomous driving high definition map of claim 1, wherein performing the object recognition process on the image of the roadway environment to detect the one or more objects comprises:
   identifying a permanent object, wherein the permanent object is a permanent stationary object that is expected to remain stationary over time.

6. The method for generating the autonomous driving high definition map of claim 5, further comprising:
   performing the object recognition process on the image of the roadway environment to detect a two-dimensional item present in the roadway environment that is to be included in the autonomous driving high definition map; and
   mapping the two-dimensional item from the vehicle frame of reference to the global frame of reference using global navigation satellite system (GNSS) data.

7. The method for generating the autonomous driving high definition map of claim 1, further comprising capturing, using a GNSS system installed on the vehicle, GNSS data.

8. The method for generating the autonomous driving high definition map of claim 1, further comprising driving, using an onboard autonomous driving system, a second vehicle using the created autonomous driving high definition map.

9. A system for generating an autonomous driving high definition map, the system comprising:
   a global navigation satellite system (GNSS) sensor;
   a camera system that captures an image of a roadway environment;
   a laser imaging detection and ranging (lidar) system that creates a lidar point cloud of the roadway environment; and
   a processing system, comprising one or more processors, that is configured to:
   perform object recognition on the image of the roadway environment to detect one or more objects present in the roadway environment, wherein the processing system being configured to perform an object recognition process comprises the processing system being configured to perform a trained deep learning process on the image of the roadway environment to detect a plurality of objects present in the roadway environment;
   identify one or more detected objects of the plurality of detected objects from the trained deep learning process that are classified as impermanent;
   perform a fusion process using the lidar point cloud to identify a location of the one or more detected objects from the image in a vehicle frame of reference, wherein the identified one or more detected objects classified as impermanent are ignored from the fusion process;
   map the one or more objects from the vehicle frame of reference to a global frame of reference using data from the GNSS sensor; and
   create the autonomous driving high definition map that comprises the mapped one or more objects in the global frame of reference.

10. The system for generating the autonomous driving high definition map of claim 9, wherein the GNSS sensor, the camera system, the lidar system, and the processing system are installed on-board a vehicle.

11. The system for generating the autonomous driving high definition map of claim 9, wherein the GNSS sensor, the camera system, and the lidar system are installed on-board a vehicle and the processing system is part of a remote server system.

12. The system for generating the autonomous driving high definition map of claim 9, wherein the processing system is further configured to calibrate the lidar system with the camera system such that distance measurements made using the lidar system correspond to determined image positions within images captured by the camera system.

13. The system for generating the autonomous driving high definition map of claim 9, wherein the processing system is further configured to:
   identify a permanent object, wherein the permanent object is a permanent stationary object that is expected to remain stationary over time.

14. The system for generating the autonomous driving high definition map of claim 13, wherein the processing system is further configured to remove the impermanent object from inclusion in the autonomous driving high definition map in response to identifying the impermanent object.

15. The system for generating the autonomous driving high definition map of claim 14, wherein the processing system is further configured to:
- perform the object recognition process on the image of the roadway environment to detect a two-dimensional item present in the roadway environment that is to be included in the autonomous driving high definition map; and
- map the two-dimensional item from the vehicle frame of reference to the global frame of reference using data from the GNSS sensor.

16. An apparatus for generating a high definition map of a roadway, the apparatus comprising:
- a means for capturing an image of a roadway environment;
- a means for creating a distance point cloud of the roadway environment;
- a means for performing an object recognition process on the image of the roadway environment to detect one or more objects present in the roadway environment, wherein the means for performing the object recognition process comprises a means for performing a trained deep learning process on the image of the roadway environment to detect a plurality of objects present in the roadway environment;
- a means for identifying one or more detected objects of the plurality of detected objects from the trained deep learning process that are classified as impermanent;
- a means for performing a fusion process using the distance point cloud to identify a location of the one or more detected objects from the image in a vehicle frame of reference;
- a means for mapping the one or more objects from the vehicle frame of reference to a global frame of reference, wherein the identified one or more detected objects classified as impermanent are ignored from the fusion process; and
- a means for creating an autonomous driving high definition map that comprises the mapped one or more objects in the global frame of reference.

17. The apparatus for generating the high definition map of the roadway of claim 16, the apparatus further comprising:
- means for performing the object recognition process on the image of the roadway environment to detect a two-dimensional item present in the roadway environment that is to be included in the autonomous driving high definition map; and
- means for mapping the two-dimensional item from the vehicle frame of reference to the global frame of reference.

* * * * *